(12) United States Patent
Nofzinger et al.

(10) Patent No.: US 10,935,131 B2
(45) Date of Patent: Mar. 2, 2021

(54) VEHICLE PARK LOCK ASSEMBLY

(71) Applicant: Dura Operating, LLC, Auburn Hills, MI (US)

(72) Inventors: Aubrey J. Nofzinger, Rochester Hills, MI (US); David K. Wright, Cass City, MI (US); Michael Goatley, Ortonville, MI (US); Clément G. Corselli, Erkrath (DE)

(*) Notice: Subject to any disclaimer, the term of this patent is extended or adjusted under 35 U.S.C. 154(b) by 12 days.

(21) Appl. No.: 16/298,433

(22) Filed: Mar. 11, 2019

(65) Prior Publication Data

US 2019/0277401 A1 Sep. 12, 2019

Related U.S. Application Data

(60) Provisional application No. 62/641,592, filed on Mar. 12, 2018.

(51) Int. Cl.
*F16H 63/34* (2006.01)
*B60T 1/00* (2006.01)

(52) U.S. Cl.
CPC .......... *F16H 63/3433* (2013.01); *B60T 1/005* (2013.01)

(58) Field of Classification Search
CPC .. F16H 63/34; F16H 63/3416; F16H 63/3425; F16H 63/3433; B60T 1/005
See application file for complete search history.

(56) References Cited

U.S. PATENT DOCUMENTS

| | | | |
|---|---|---|---|
| 5,630,339 A | 5/1997 | Tuday | |
| 5,893,439 A | 4/1999 | Park | |
| 7,861,839 B2 | 1/2011 | Schweiher et al. | |
| 2017/0088111 A1 | 3/2017 | Kirchner | |
| 2019/0049005 A1* | 2/2019 | Clark | B60T 1/005 |

FOREIGN PATENT DOCUMENTS

| | | | |
|---|---|---|---|
| CN | 104074971 A | 10/2014 | |
| DE | 102016200542 A1 | 7/2017 | |
| DE | 102016124463 A1 * | 6/2018 | ......... F16H 63/3425 |
| EP | 1855033 A2 | 11/2007 | |

* cited by examiner

*Primary Examiner* — David R Morris
*Assistant Examiner* — Lori Wu
(74) *Attorney, Agent, or Firm* — Vivacqua Crane

(57) ABSTRACT

In at least some implementations, a park lock assembly for a rotary component of a vehicle includes a lock body having at least one void, a lock member having an engagement portion selectively received within one of said at least one void, an actuator that drives the lock member to a position wherein the engagement portion may be received within one of said at least one void, and a biasing member received between the actuator and the lock member to permit the lock member to move relative to the actuator. The biasing member providing a force on the lock member tending to move the lock member toward the lock body.

9 Claims, 13 Drawing Sheets

VEHICLE PARK LOCK ASSEMBLY

REFERENCE TO RELATED APPLICATIONS

This application claims the benefit of U.S. Provisional Application Ser. No. 62/641,592 filed Mar. 12, 2018, the entire contents of which is incorporated herein by reference in its entirety.

TECHNICAL FIELD

The present disclosure relates generally to a vehicle park lock assembly.

BACKGROUND

Vehicles have a park setting or gear in which the transmission may be locked and the vehicle turned off. The park lock needs to firmly hold the vehicle against movement when engaged, and needs to be able to disengage to even when a vehicle is parked on a hill or other grade and gravitational forces on the vehicle provide a load on the vehicle park lock system.

SUMMARY

In at least some implementations, a park lock assembly for a rotary component of a vehicle includes a lock body having at least one void, a lock member having an engagement portion selectively received within one of said at least one void, an actuator that drives the lock member to a position wherein the engagement portion may be received within one of said at least one void, and a biasing member received between the actuator and the lock member to permit the lock member to move relative to the actuator. The biasing member providing a force on the lock member tending to move the lock member toward the lock body.

In at least some implementations, a drive coupling is included and is driven by the actuator relative to the lock member, and the biasing member is engaged with both the lock member and the drive coupling, and the drive coupling engages the lock member to move the lock member away from the lock body. In at least some implementations, the drive coupling engages the spring which increases the spring force on the lock member to move the lock member toward the lock body. In at least some implementations, the lock member rotates about an axis that is parallel to an axis of rotation of the lock body. In at least some implementations, the lock member moves parallel to an axis of rotation of the lock body. And in at least some implementations a cam is rotated by the actuator, and the cam has two cam surfaces at varying distances from the lock member to drive the lock member toward the lock body and permit the lock member to move away from the lock body.

BRIEF DESCRIPTION OF THE DRAWINGS

The following detailed description of some implementations of a shifter will be set forth with regard to the accompanying drawings, in which.

DETAILED DESCRIPTION

Figure 1:
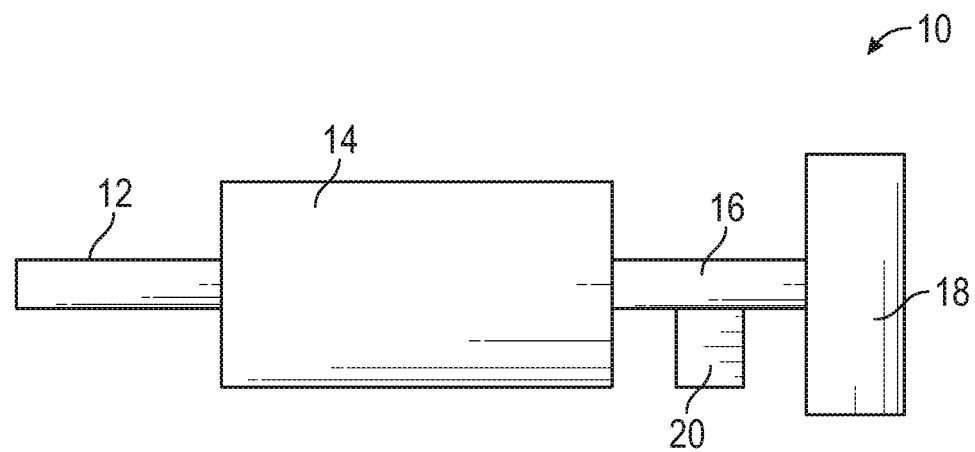
FIG. 1 is a diagrammatic view of a power transmission assembly including a park lock assembly.

Referring in more detail to the drawings, FIG. 1 illustrates a vehicle power transmission assembly 10 that includes an input shaft 12, a transmission 14 and an output shaft 16. The power transmission assembly 10 may be part of an electric vehicle powertrain, such as a so-called e-axle that may include an electric motor, one or more gears with the output shaft coupled to the gear(s). The output shaft may also be coupled to a vehicle wheel 18 to drive the wheel for rotation. When the vehicle is parked, it may be desirable to provide a park lock assembly 20 to, in at least some implementations, lock the axle or some other component of the transmission (e.g. the output shaft 16) against rotation, to prevent or at least substantially inhibit rotation of the wheels of the vehicle. In at least some implementations, the park lock assembly 20 is associated with and operable to selectively prevent rotation of the output shaft 16. The park lock assembly 20 may be located downstream of the transmission 14 and any gear(s), if desired.

Figure 2:
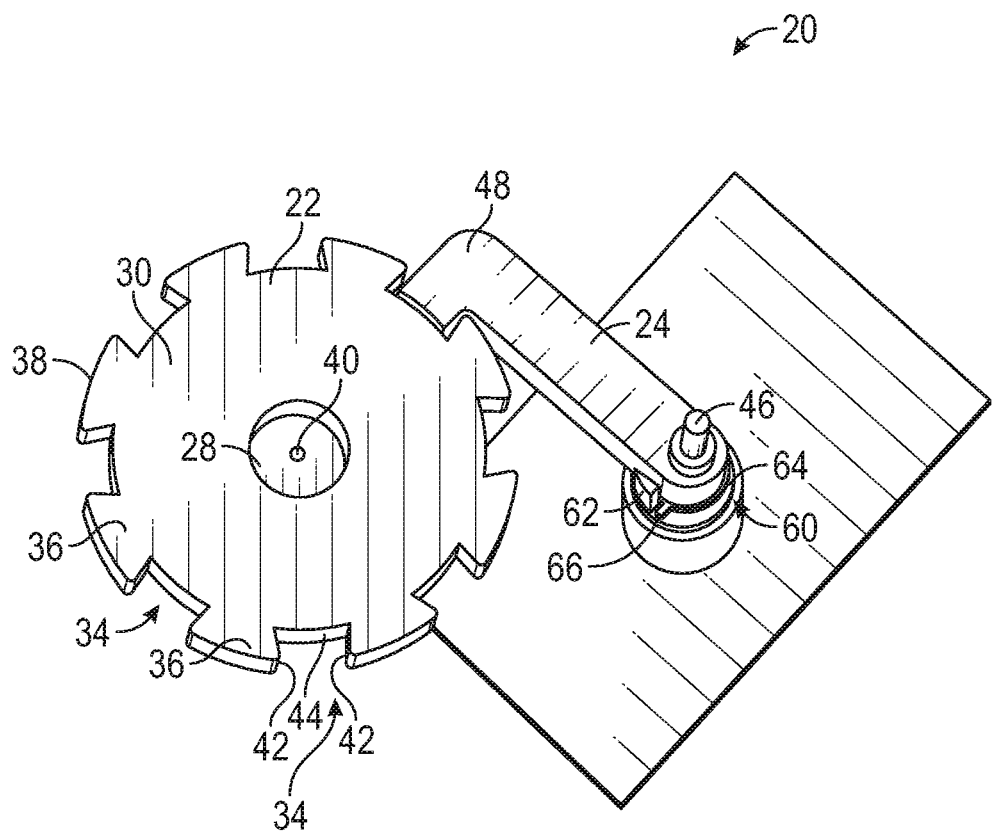
FIG. 2 is a top view of a park lock assembly including a lock body having a plurality of circumferentially spaced apart voids and a lock member movable relative to the body.
Figure 3:
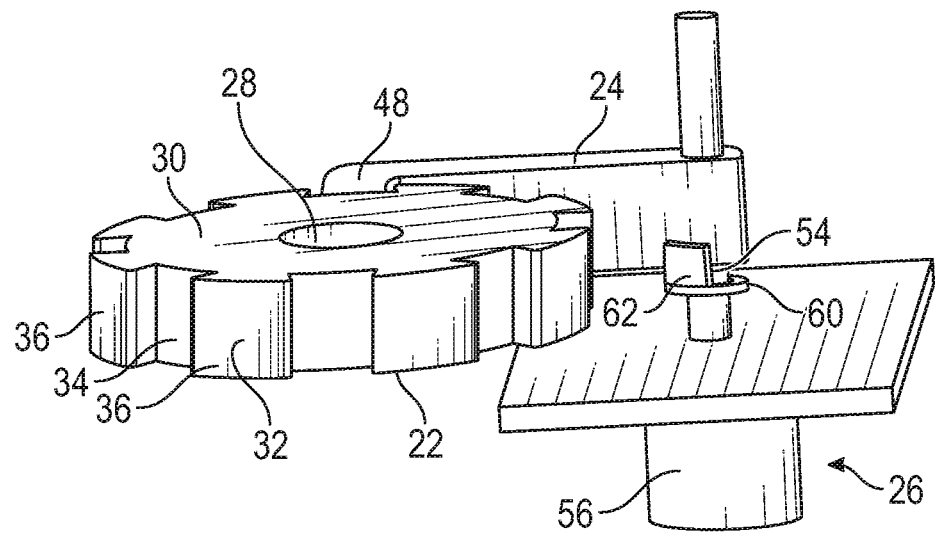
FIG. 3 is a perspective view of the park lock assembly showing an actuator.
Figure 4:
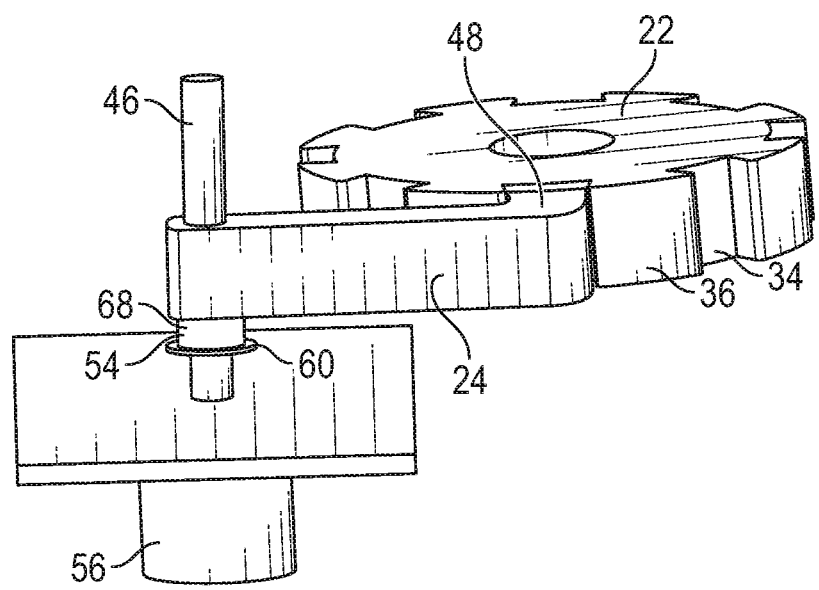
FIG. 4 is another perspective view of the park lock assembly taken from the opposite side as FIG. 2.

In at least some implementations, such as is shown in FIGS. 2-4, the park lock assembly 20 includes a lock body 22 coupled to the output shaft (as described below) for co-rotation with the output shaft, a lock member 24 movable relative to the lock body 22 and selectively engageable with the lock body, and an actuator 26 that drives the lock member relative to the lock body.

The lock body 22 may be fixed to the output shaft for co-rotation with the output shaft 16. In this way, engaging and preventing rotation of the lock body 22 may also prevent rotation of the output shaft. To couple the lock body 22 to the output shaft 18, in at least some implementations, the lock body has a central bore 28 through which output shaft coaxially extends. The lock body may be generally cylindrical with axially opposed faces 30, 32 that extend radially from the central bore 28 to a radial outer periphery of the lock body. To facilitate engagement of the lock body 22 by the lock member 24, the lock body 22 may have a plurality of voids 34 that may be formed in or open to the radial outer periphery of the lock body. Multiple lands 36 may be defined with each land defined between two adjacent voids 34. With the voids 34 open to the radial outer periphery of the lock body 22, a radial outer surface 38 of the lock body is not at a constant radial distance from a central axis 40 of the lock body. To prevent rotation of the lock body 22 in either direction when engaged by the lock member 24, the voids 34 may have rotationally opposed stop surfaces 42, that is, axially and radially extending surfaces that face in generally opposite directions and are circumferentially spaced apart. In at least some implementations, the stop surfaces 42 are either parallel to each other or at an angle such that imaginary planes including the stop surfaces intersect outboard of the radial outer periphery 38 of the lock body. Thus, the void 34 either has the same circumferential length along its radial depth (e.g. its radial extent from the outer surface to a radially inner surface of the void) or the circumferential length increases from the outer surface 38 to a radially inner surface 44 of the void.

To selectively engage and prevent rotation of the lock body 22, the lock member 24 is movable relative to the lock body. In at least some implementations, the lock member 24 may be pivoted relative to the lock body, although other movements such as sliding or more complex paths of motion may be used, if desired. In the example shown, the lock member 24 is rotatable or pivotable about a shaft 46. An axis of the shaft 46 may be parallel to the axis 40 of rotation of the output shaft 16 and lock body 22. The shaft 46 may be straight and cylindrical without any voids (holes, slots, cavities) therein, or at least in its outer surface. The shaft 46 could be hollow tube with a cylindrical outer surface, if desired. To facilitate retaining the lock member 24 on the shaft 46, the lock member may include a bore through which the shaft extends, although the shaft could be received in a blind bore formed in the lock member such that the shaft does not extend fully through the lock member. The lock member 24 may be rotatable relative to the shaft 46, or it may be fixed to the shaft for rotation with the shaft. The lock member 24 includes an engagement portion 48 that is adapted for receipt in a void 34 of the lock body 22.

Figure 6:
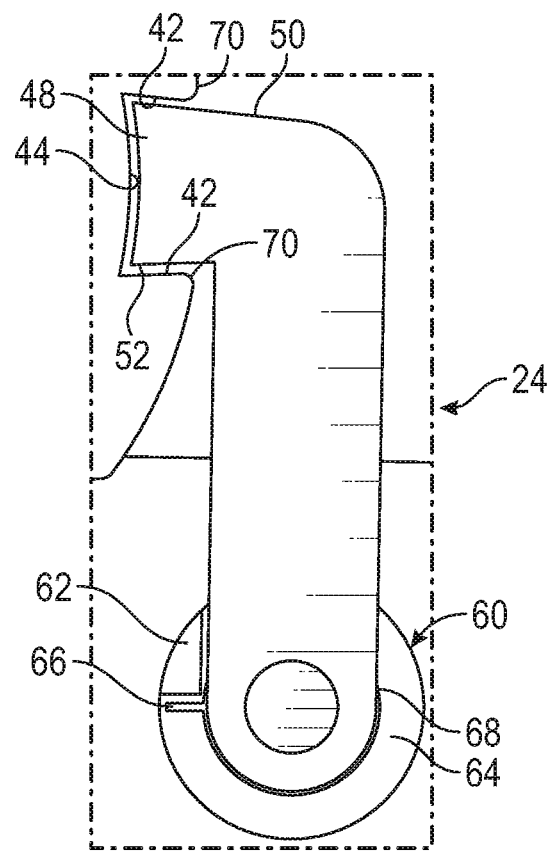
FIG. 6 is an enlarged, fragmentary top view of the lock member and a portion of the lock body.

The engagement portion 48 may be defined by or at an end of the lock member 24, and as shown in FIGS. 2-4 and 6, may be defined in an end that is bent to face generally circumferentially relative to the pivot axis. The engagement portion may be complementarily shaped to the void(s) 34 and smaller than the void(s) for receipt in the void(s). As best shown in FIG. 6, radially spaced apart sides 50, 52 (relative to pivot axis) of the engagement portion 48 may be tapered such that a free end of the engagement portion has a greater radial size than does a portion spaced from the free end. The greater radial dimension is still less than the smallest circumferential length of each void 34 (relative to the lock body axis) so that the engagement portion 48 can fit into the void 34 as shown. The engagement portion 48 may have same or similar (e.g. within 50%) axial width as the lock body 22, if desired. Significant force may be applied to the lock member 24 via the lock body 22, for example, if the vehicle is parked on a hill and the lock body and lock member hold the vehicle against rolling down the hill.

In some implementations, a single actuator 26 may drive the lock member 24 into and out of engagement with the lock body 22, and in other implementations, more than one actuator may be used. In at least some implementations, a second actuator such as a spring 54, assists or drives the lock member toward the lock body, and an electrically powered actuator, such as an electric motor 56, drives the lock member away from the lock body. In the non-limiting example shown in FIGS. 2-6, the actuator 26 includes a reversible electric motor 56 that rotates in a first direction to cause the lock member 24 to engage the lock body 22 and in a second, opposite direction to disengage the lock member from the lock body. While the motor 56 controls rotation of the lock member 24 toward the lock body 22, this motion may be provided to the lock member through or via the spring 54, as described in more detail below.

Figure 5:
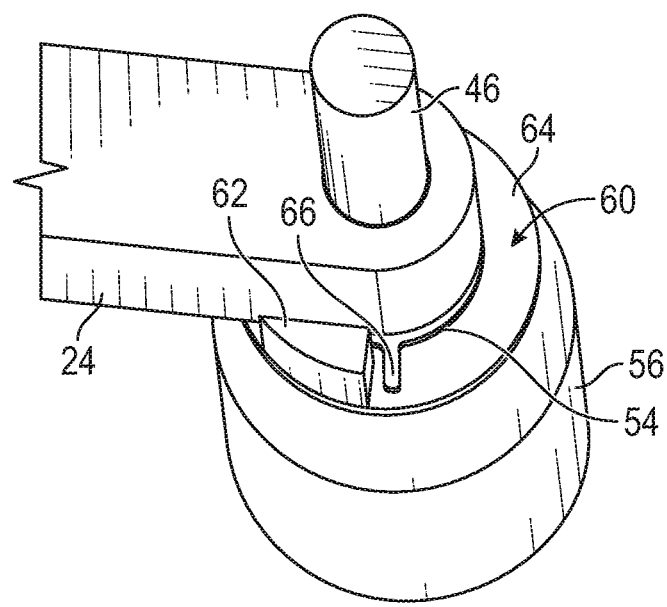
FIG. 5 is an enlarged, fragmentary perspective view of an actuator assembly and the lock member.

The motor 56 may rotate a drive shaft, which may define the shaft 46 about which the lock member 24 rotates or pivots. In at least some implementations, the shaft 46 rotates relative to and does not directly drivingly engage the lock member 24. Instead, a drive coupling 60 is fixed to the drive shaft 46 for co-rotation with the drive shaft. As best shown in FIGS. 3, 5 and 6, the drive coupling 60 as shown has a central bore through which drive shaft 46 extends, is received axially between the motor 56 and the lock member 24, and has an outwardly extending drive tab 62 that is selectively engageable with the lock member 24. The spring 54 may be positioned axially between the drive coupling 60 and lock member 24 although the spring can be otherwise arranged. The drive coupling 60 may have radially extending flange 64 that provides a base that supports spring 54 and/or the lock member 24 in a desired axial location aligned with lock body 22.

The spring 54 may be received between the coupling 60 and the lock member 24 and arranged to provide a rotational force on the lock member. In at least some implementations, the spring 54 may be a torsion spring having one end 66 engaged with the drive tab 62 of the coupling 60 and another end 68 (FIG. 4) engaged with a surface (e.g. an outer surface) of the lock member 24. Rotation of the coupling 60 in one direction may compress the spring 54 and increase the force the spring provides on the lock member 24 to rotate the lock member toward the lock body 22. Rotation of the coupling 60 in the opposite direction reduces the spring force and may engage the drive tab 62 with the lock member 24 to rotate the lock member away from the lock body 22. In this way, rotation of the shaft 46 by the motor 56 controls both engagement and disengagement of the lock member 24 and the lock body 22.

With the spring 54 between the actuator (e.g. motor 56 and drive coupling 60) and the lock member 24, the lock member may be yieldably driven toward the lock body 22. If a void 34 of the lock body 22 is not aligned with the engagement portion 48 of the lock member 24, then the engagement portion of the lock member will engage a land 36 of the lock body and be held against the land by the force of the spring 54 acting on the lock member. When the lock body 22 rotates enough to align a void 34 with the engagement member 48, the lock member 24 will rotate about the drive shaft 46 under the spring force and the engagement member will enter the aligned void. In at least some implementations, the voids 34 and engagement portion 48 are sized and arranged, and the spring rate or force is chosen, so that engagement portion is not received within void unless the output shaft is rotating at a speed associated with the vehicle traveling less than 2 or 3 miles per hour. Thus, even if the park lock assembly 20 is actuated when the vehicle is moving at a faster rate, the park lock assembly will not engage. Instead, the lock member 24 may bounce outwardly from or slide along the lands 36 of the rotating lock body 22 without entering a void 34 of the lock body. Thus, the lock member 24 may rotate about the drive shaft 46 as permitted by the spring 54.

In the implementation shown and as noted above, the voids 34 are defined by inclined stop surfaces 42 so that the voids become circumferentially larger from a radial outer edge 70 (FIG. 6) of the stop surfaces to the radial inner surface 44 of the voids 34. Further, if desired and as shown and described herein, the engagement portion 48 of the lock member 24 may be tapered to have a complementary shape. When the engagement portion 48 is received within a void 34 the spring force will generally hold the engagement portion free end against the radial inner surface 44 of the void 34. With the lock member 24 engaged with the lock body 22, as shown in FIG. 6, rotation of the lock body even a relatively small amount (e.g. less than 5 degrees) in either direction would engage a stop surface 42 with an opposed surface 50, 52 of the lock member 24 to prevent further rotation of the lock body 22. Further, the engagement of the angled stop surfaces 42 of the lock body 22 with the likewise angled surfaces 50, 52 of the lock member 24 tends to rotate the lock member further toward the lock body to retain or further improve the engagement between these components rather than tending to rotate the lock member away from the lock body which would tend to disengage these components. Accordingly, a large actuator force is not needed to hold the lock member 24 in engagement with the lock body 22 and the locked engagement of these components can be maintained even with large forces acting on the assembly (e.g. when the vehicle is parked on a hill). In at least some implementations, the larger force on the assembly 20 may be relieved by, for example, driving the output shaft 16 against the applied force to balance out some or all of the applied force. Then, the actuator 56 can be driven to engage the coupling tab 62 with the lock member 24 to rotate the lock member 24 away from the lock body 22 and remove the engagement portion 48 from the void 34 of the lock body.

Figure 7:
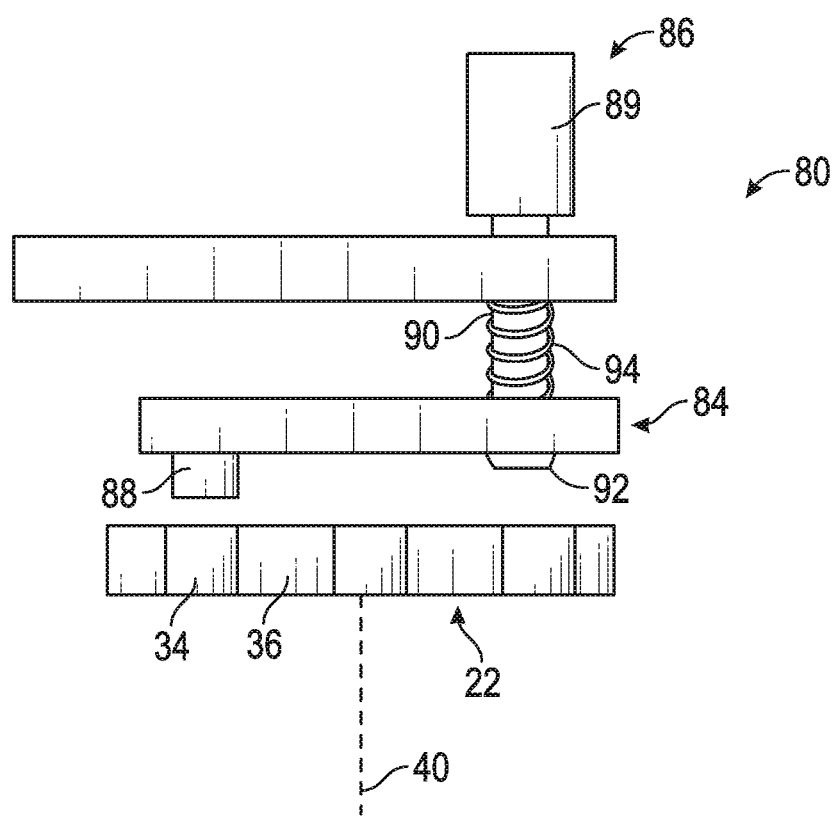
FIG. 7 is a diagrammatic front view of a park lock assembly showing a center-mounted and rotatable lock member that moves axially relative to the lock body.

Another park lock assembly 80 is shown in FIG. 7 and includes a lock body 22, a lock member 84 and an electrically powered actuator 86. The lock body 22 may be constructed and arranged as set forth above and hence, will not be described in detail again. The lock member 84 may be movable toward and away from the lock body 22 in a direction parallel to the axis 40 of the lock body. One or more engagement portions 88 of the lock member 84 may overlap the lock body 22 and be received in one or more voids 34 in the lock body and engaged by stop surfaces of the lock body to inhibit or prevent rotation of the lock body. In the example shown, the engagement portion includes a tab 88 that extends axially from a main body 90 of the lock member 84. Multiple tabs 88 may be circumferentially spaced apart for receipt in separate voids 34 in the lock body 22, if desired. The tab 88 may be received in one of the voids 34 which are open to the radial outer periphery of the lock body or to voids that are radially inwardly spaced from the radial outer surface of the lock body, which voids may include through holes through the lock body or cavities that do not extend axially through the lock body.

The actuator 86 may be coupled to the lock member 84 to move the lock member in at least one direction relative to the lock body 22. In the example shown, the actuator 86 includes a motor 89 (or other powered drive element) and a drive shaft 90 that extends through an opening of the lock member 84 and includes an enlarged head or a fastener 92 (e.g. a nut or clip) that overlies part of the lock member. The lock member 84 may be offset from the axis 40 of the lock body 22 to prevent engagement with the output shaft 16 that extends through the lock body. The actuator 86 may axially move the lock member 84 away from the lock body 22 by engagement of the head/fastener 92 with the lock member 84. The actuator 86 may extend the drive shaft 90 toward the lock body 22 to permit the lock member 84 to move toward the lock body. In this regard, a second actuator, shown as a coil spring 94, may provide a force axially moving the lock member 84 toward or into engagement with the head/fastener 92. The actuator 86 may rotate or linearly displace the drive shaft 90 and thus, may be of various different types of drive element including, but not limited to, a motor, a solenoid, or a linear actuator such as a piezoelectric, pneumatic or hydraulic piston, ball screw or other electromechanical drive, and the drive shaft 90 may be a lead screw or a cylindrical shaft, for example.

The lock member 84 may move away from the head/fastener 92 and against the force of the spring 94 when, for example, the engagement tab 88 is engaged with the lock body 22 and not received in a void 34. This separates the forces on the lock member 84 from the actuator 86 and reduces impact or impulse forces in the assembly 80 as the lock member engages the lock body 22. In at least some implementations, the voids 34 and engagement tab 88 are sized and arranged, and the spring rate or force is chosen, so that engagement tab 88 is not received within a void 34 unless the output shaft 16 and lock body 22 are rotating at a speed associated with the vehicle traveling less than 2 or 3 miles per hour. Thus, even if the park lock assembly 80 is actuated when the vehicle is moving at a faster rate, the park lock assembly will not engage until the vehicle speed is at or below the threshold. Instead, the lock member tab 88 may bounce or slide along the lock body 22 without entering a void 34 in the lock body. Thus, the lock member 84 may move relative to the drive shaft 90 as permitted by the spring 94. To disengage the lock member 84 from the lock body 22, the drive shaft 90 is retracted and the head/fastener 92 engages the lock member 84 and pulls the lock member 84 toward the motor 89 and away from the lock body 22.

Figure 8:
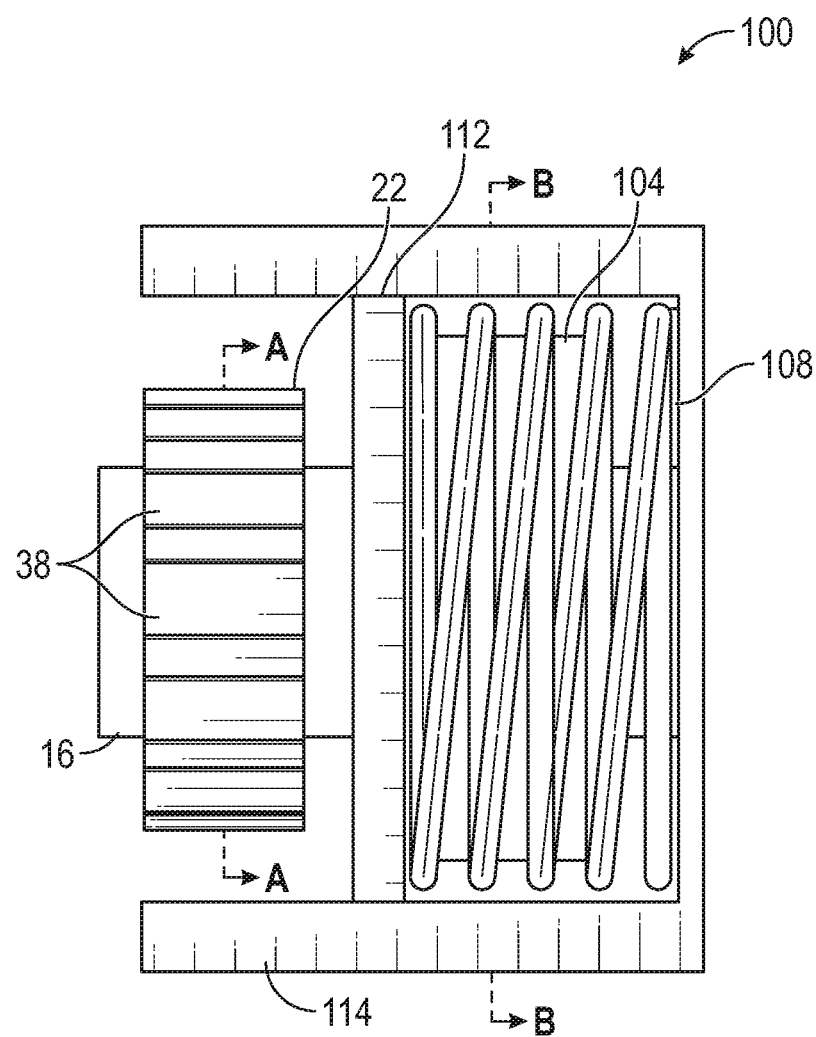
FIG. 8 is a side view of a park lock assembly including a lock member that is moved axially by an actuator to selectively surround at least a portion of a radial outer surface of a lock body.
Figure 9:
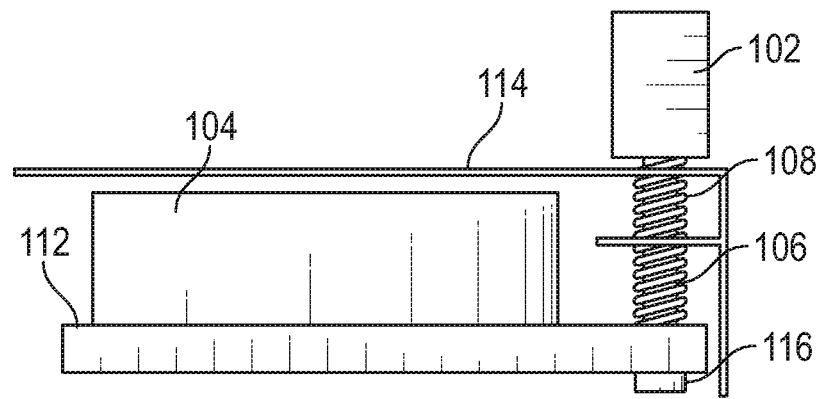
FIG. 9 is a side view showing the actuator and lock member.
Figure 10:
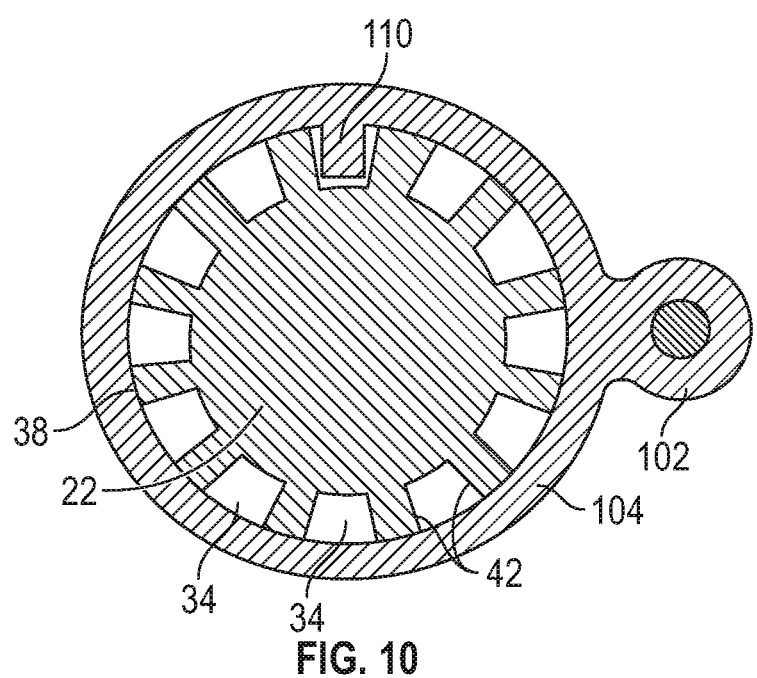
FIG. 10 is a sectional view taken generally along line A-A in FIG. 8.

FIGS. 8-11 illustrate a lock assembly 100 that is functionally similar to the lock assembly 80 shown in FIG. 7 and described above. As shown in FIGS. 9 and 10, the actuator 102 in the assembly 100 is radially offset from an axis 40 of the lock member 104 and lock body 22 and moves a drive shaft 106 in a first direction to permit a spring 108 (FIGS. 8 and 9) to advance the lock member 104 toward the lock body 22. The actuator 102 moves the drive shaft 106 in a second direction to retract the lock member 104 away from the lock body 22 against the force of the spring 108. The lock member 104 may be annular or includes an annular portion that is received around at least a portion of the radial outer periphery of the lock body 22, and through which the output shaft 16 extends as shown in FIG. 8. One or more inwardly extending engagement portions or tabs 110 (FIG.

10) are carried by or formed integrally with the lock member 104 and each are arranged to be received in one of one or more voids 34 formed in the lock body 22, shown as including a plurality of circumferentially spaced apart voids 34 that are open to the radial outer periphery 38 of the lock body 22 and extend radially inwardly between opposed stop surfaces 42.

Figure 11:
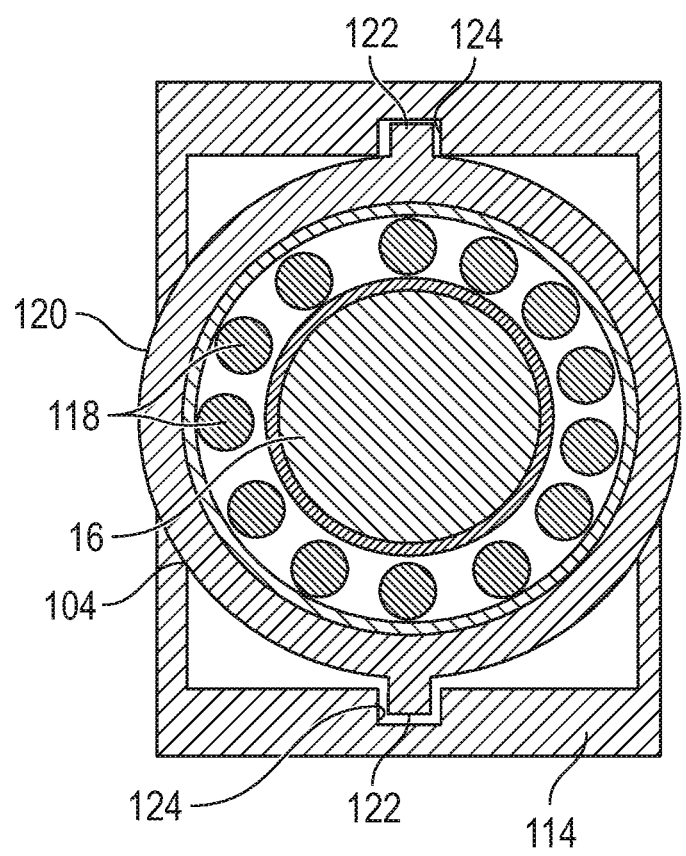
FIG. 11 is a sectional view taken generally along line B-B in FIG. 8.

In FIGS. 8 and 9, the spring 108 is shown as a coil spring received or trapped and compressible between a radially outwardly extending flange 112 of the lock member 104 and a housing 114 or other support surface to provide a force on the lock member 104 tending to move or yieldably biasing the lock member toward the lock body 22. The spring 108 could otherwise be arranged to act on the lock member 104 as desired. Further, the drive shaft 106 may extend through the flange 112 and the flange may be located between the head/fastener 116 (FIG. 9) and motor or other drive element of the actuator 102. As shown in FIG. 11, bearings 118 or the like may be disposed between the lock member 104 and the output shaft 16 to facilitate smooth sliding motion of the lock member relative to the lock body 22 and to inhibit or prevent tilting or skewing of the lock member relative to the lock body due to the eccentric driving by the actuator 102 and/or spring 108. In this regard, the spring 108 may be received about the radial outer periphery 120 of the lock member 104 to provide a more coaxially oriented force to reduce the tendency of the lock member to tilt which may increase the resistance to movement of the lock member. If desired, one or more guiding features may be provided to facilitate linear movement of the lock member and inhibit or prevent undue tilting or skewing of the lock member as it translates between its retracted position (corresponding to the unlocked position of the lock assembly 100) and the extended position (corresponding to the locked position of the lock assembly 100). In the embodiment shown, the guiding features are defined by tabs 122 carried by or integrally formed in the same piece of material as the lock member 104 and slots or tracks 124 formed in the housing 114. Two sets of tabs 122 and tracks 124 may be provided, diametrically opposed, if desired. Of course, more or fewer or other arrangements of tabs and tracks may be used, or other guiding features may be used as desired.

Figure 12:
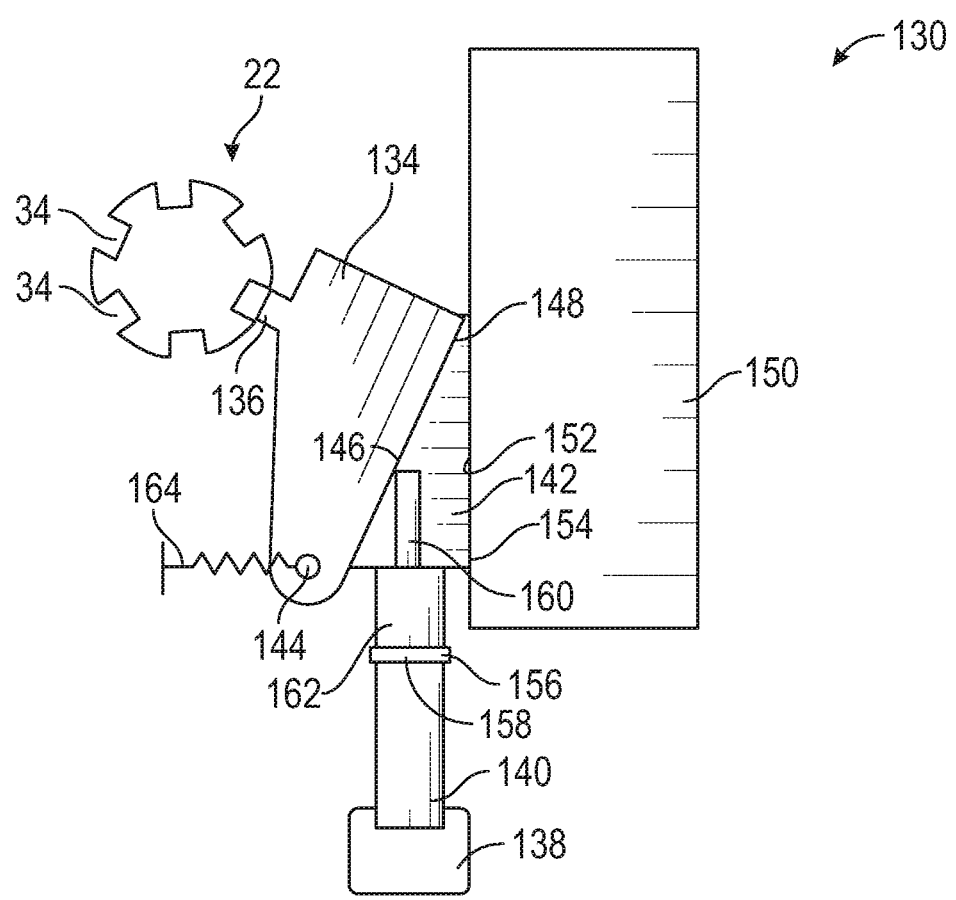
FIG. 12 is a side view of a park lock assembly.
Figure 13:
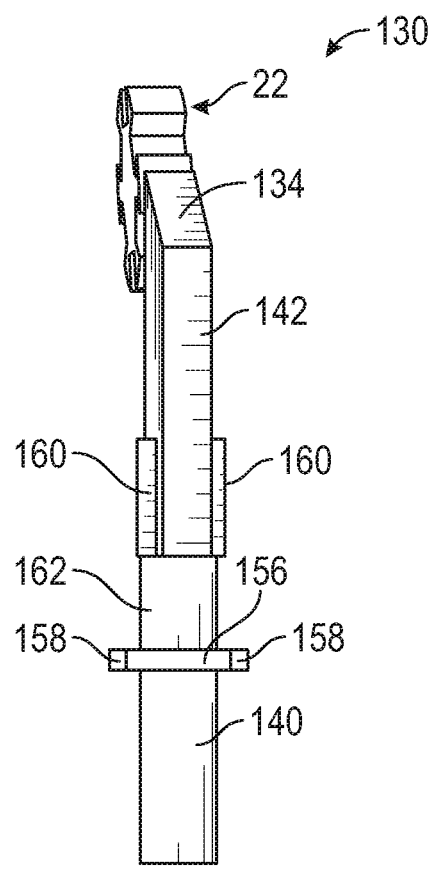
FIG. 13 is a perspective rear view of the park lock assembly.

Another lock assembly 130 is shown in FIGS. 12 and 13. This lock assembly includes a lock body 22 that may be similar to the lock body described above with reference to the lock assembly 20 shown in FIGS. 2-6. As such, the lock body 22 may include voids 34 that are open to and circumferentially spaced about a radial outer periphery of the lock body. The lock member 134 in this embodiment may include an engagement portion 136 adapted to be selectively received within an aligned one of the voids 34, as generally described above. An actuator 138 may include a drive shaft 140 that moves a drive member 142 relative to the lock member 134 to move the lock member toward a first position in which the engagement portion 136 is within a void 34, and to move or permit movement of the lock member away from the lock body 22 to a second position. In the example shown, the drive shaft 140 is moved linearly and the lock member 134 is pivoted about an axis 144 that may be defined by a pin separate from the actuator. The drive shaft 140 may be rotated by a motor of the actuator 138 and, if desired, the drive member 142 may be constrained to linear movement. During at least a portion of the stroke or range of movement of the drive member 142, a drive engagement member or surface 146 of the drive member 142 abuts a driven engagement surface 148 of the lock member 134 to rotate the lock member about the pivot axis 144. One or both of the drive engagement surface 146 and driven engagement surface 148 is/are inclined, that is, not parallel to, the path of movement of the drive member 142. In this way, increasing movement of the drive member 142 in one direction causes increasing rotation of the lock member 134 to eventually move the lock member to its first position. In the example shown, both the drive and driven engagement surfaces 146, 148 are inclined relative to the path of movement of the drive member 142. To resist movement of the lock member 134 out of the first position when such movement is not desired, the drive member 142 may be received between a support 150 and the lock member. Thus, movement of the lock member 134 out of the first position is resisted or prevented by engagement of the lock member with the drive member 142, because the drive member is engaged by the support 150 which prevents movement in that direction of the drive member. In the example shown, the support 150 has a supporting surface 152 engaged with a supported surface 154 of the drive member 142 and the supporting surface 152 and support surface 154 and drive surface are both parallel to the path of movement of the drive member and generally opposed (i.e. within 45 degrees of perpendicular to) the arcuate path of movement of the lock member 134 away from the first position.

The actuator 138 may include a lead screw or other rotary drive shaft 140 that rotates and causes linear movement of a drive coupling, shown as a washer 156. The washer 156 drives the drive member 142 to the first and second positions wherein the lock member 134 is engaged with the lock body 22 when the drive member is in the first position and the lock member is not engaged with the lock body when the driven member is in the second position. The washer 156 may include guide features 158 that cooperate with guide features 160 on the drive member 142 to guide and restrain the washer for linear movement. In the example shown, the washer includes one or more radially outwardly extending tabs 158 that are received in linear slots or grooves 160 in the drive member 142. The washer 156 may be annular and may be received around the lead screw or drive shaft 140 of the actuator 138. A biasing member 162 may be received operably between the lead screw 140 and the washer 156 to permit movement of the washer relative to the lead screw. In the example show, the biasing member is a coil spring 162 that is received around the lead screw 140 and has one end engaged with the washer 156 and another end engaged with the drive member 142. The biasing member 162 may reduce the shock or impact loading on the lead screw 140 and actuator 138 when the lock member 134 is not aligned with a lock body void 34 and engagement of the lock member with the lock body 22 doesn't occur even though the actuator 138 has caused the lock member 134 to move sufficiently to cause engagement with the lock body (e.g. if the lock body is rotating faster than a threshold speed, or if the void is not aligned with the lock member). Both the lock member 134 and drive member 142 may bounce or move relative to the lock body 22 when engagement of the lock member is attempted while the lock body is rotating faster than the threshold and/or the lock body void is not aligned with the lock member.

A second biasing member 164, which may be a spring, may provide a force that yieldably biases the lock member 134 toward the position in which the lock member is not engaged with the lock body 22 (i.e. spring 164 biases the lock member away from the lock body). The spring 164 may, for example, be a torsion spring having one end engaged with the lock member 134 and the other end engaged with the pivot pin about which the lock member rotates. Thus, when the actuator 138 moves the drive member 142 to a position that permits disengagement of the lock member 134 from the lock body 22, the lock member can be moved away from the lock body by the second biasing member 164, which may drive the drive member 142 toward the actuator 138.

Figure 14:
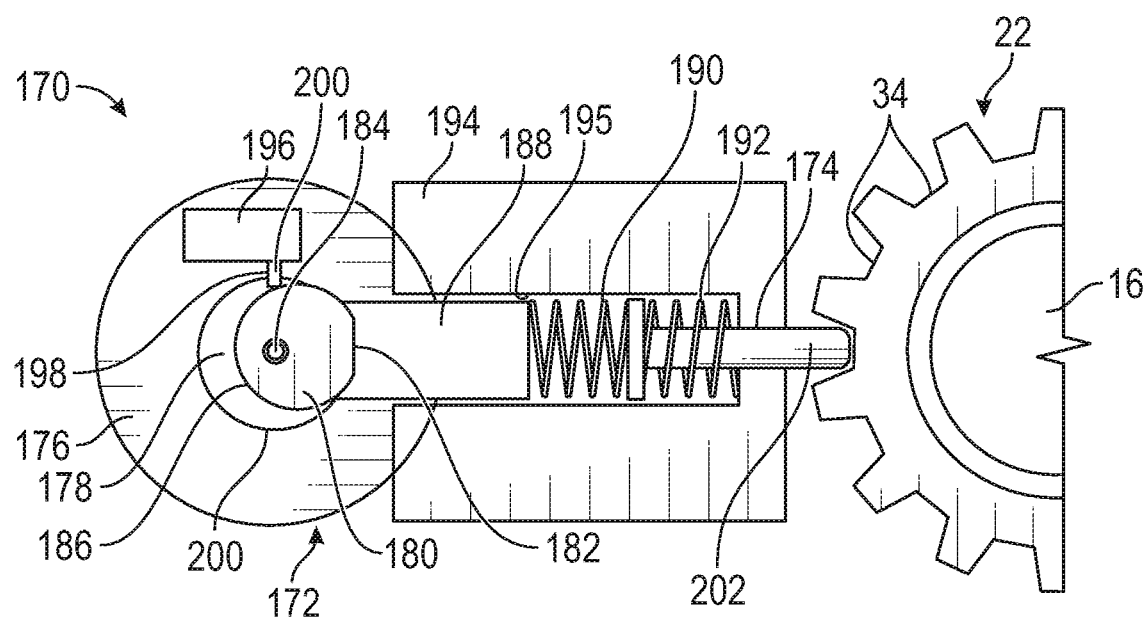
FIG. 14 is a diagrammatic plan view of a park lock assembly.
Figure 15:
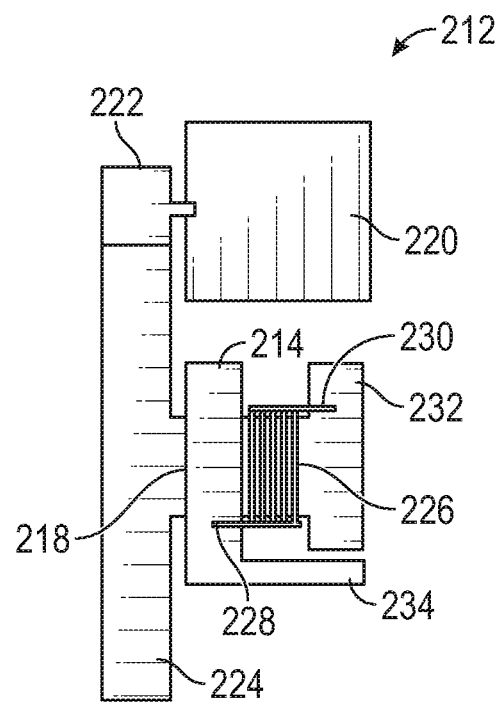
FIG. 15 is a side view of a park lock assembly.

Another lock assembly 170 is shown in FIG. 14. This assembly 170 includes an actuator 172 that moves a lock member 174 relative to a lock body 22. The actuator 172 includes a motor 176, a drive shaft 178 rotated by the motor 176, and a cam 180 rotated by the drive shaft. The cam 180 may be eccentrically mounted on the drive shaft 178 providing a lobe with a first cam surface 182 that is radially further from an axis 184 of the shaft 178 than a second cam surface 186. The actuator 172 may further include a plunger 188 and a first biasing member, such as a coil spring 190, received between the plunger and the lock member 174. The first spring 190 may keep the plunger 188 engaged with the cam 180 so that the plunger is responsive to movement of the cam, as will be described in more detail below. A second biasing member, which may also be a coil spring 192 is compressed between the lock member 174 and a housing 194 with a cavity 195 that supports the plunger 188, springs 190, 192 and the lock member 174.

In use, the motor 176 rotates the drive shaft 178 which rotates the cam 180 relative to the plunger 188. When the first cam surface 182 is aligned with the plunger 188, the plunger is displaced against the force of the first spring 190 which compresses the first spring 190 against the lock member 174. The first spring 190 acts on the lock member 174 and advances the lock member toward the lock body 22 against the force of the second spring 192. When a void 34 of the lock body is aligned with the lock member 174, an end of the lock member is received within the void 34 to prevent rotation of the lock body 22 and output shaft 16. When a void is not aligned with the lock member 174, or if the lock body 22 is rotating faster than a threshold speed, then the lock member may be resiliently maintained against or urged toward the lock body by the springs 190, 192 which permit some movement of the lock member 174 relative to the plunger 188.

When it is desired to unlock the assembly 170 to permit the lock body 22 to rotate, the motor 176 rotates the drive shaft 178 further, which rotates the cam 180 relative to the plunger 188 to remove the first cam surface 182 from engagement with the plunger 188. When the plunger 188 is permitted to move far enough away from the lock body, then the force of the first spring 190 acting on the lock member 174 will be reduced so that the second spring 192 can displace the lock member 174 away from the lock body 22. In the embodiment shown, the cam is rotated until the second cam surface 186 is aligned and engaged with the plunger 188 which permits the plunger to move away from the lock body 22 sufficiently so that the lock member 174 can be removed from the lock body. In the embodiment shown, the first and second cam surfaces 182, 186 are diametrically opposed. Therefore, the motor 176 can rotate in a single direction to rotate the cam 180 in a single direction, 180 degrees each actuation to alternately engage the first cam surface 182 and second cam surface 186 with the plunger 188. This may permit use of a less expensive motor and a simpler control scheme for the actuator 172 in general. In the embodiment shown, a limit switch 196 is used to determine when the cam 180 has rotated from one position to the next, for example, as may be detected by a piston 198 of the limit switch being received in a cavity 200 of the cam. The cam 180 has two cavities 200 arranged so that the piston 198 is received in one of the cavities when the cam 180 is in a first position (e.g. with the first cam surface 182 engaged with the plunger 188) and the piston 198 is received in the other of the cavities when the cam 180 is in a second position (e.g. with the second cam surface 186 engaged with the plunger 188).

In at least some implementations, to better retain the engagement portion 202 of the lock member 174 within a void 34 of the lock body 22, the engagement portion and the voids 34 may be formed with inclined surfaces as described above with regard to the lock assembly 20 of FIGS. 2-6. Thus, even with the lock member being held in its advanced position by the spring 190 (as compressed by the plunger 188), the engagement of the lock member 174 and lock body 22 can be ensured until the lock member is withdrawn from the lock body.

Another park lock assembly 210 is shown in FIGS. 15-23 and includes an actuator assembly 212, a lock member 214 driven by the actuator assembly relative to the lock body 22. The lock body 22 may be as described in any of the previous embodiments, may include one or more voids 34, and may be fixed for co-rotation to the output shaft 16 or another rotary component of the vehicle. To selectively prevent rotation of the lock body 22, the lock member 214 includes an engagement portion 216 adapted to be received in a void 34 of the lock body 22. The lock member 214 is pivoted about a shaft 218 which is rotated by an actuator, which may be an electric motor 220, in at least some implementations. In the example shown, the motor 220 drives a spur gear 222 that is mated with a larger driven gear 224 to provide a torque increase. The driven gear 224 is coupled to the shaft 218 for co-rotation of the driven gear and shaft. Of course, other actuating assemblies may be used, including but not limited to the shaft 218 being directly driven by the motor 220 without intervening gears, or the shaft being a lead screw or other rotary drive component.

Figure 16:
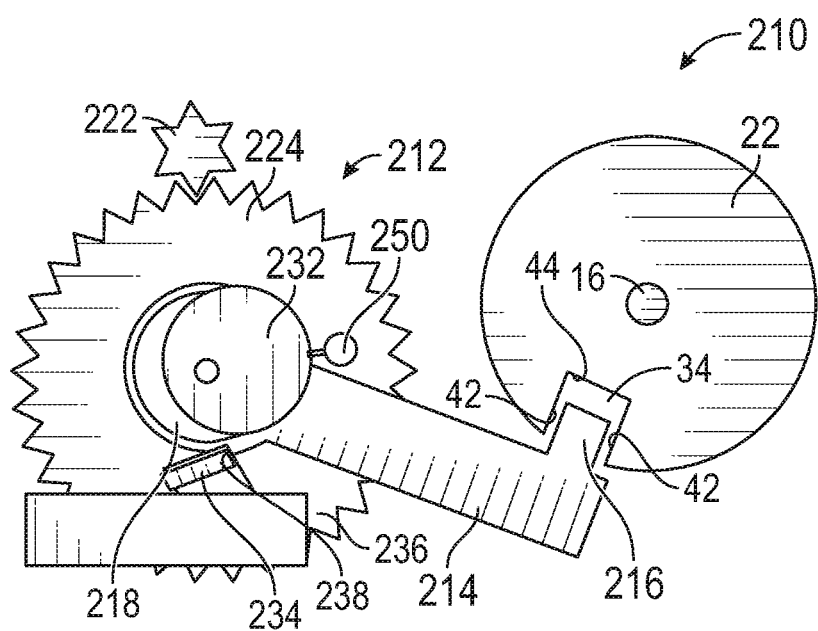
FIG. 16 is a front view of the assembly in FIG. 15 shown in a locked position.

In at least some implementations, the lock member 214 may rotate at least some amount relative to the shaft 218 to provide a more flexible engagement of the lock member with the lock body 22, as described above. To permit at least some movement of the lock member 214 relative to the shaft 218, a biasing member 226 is provided between them. In the implementation shown, the biasing member is a torsion spring having a first end 228 engaged with the lock member and a second end 230 engaged with the shaft 218, for example, a cam 232 fixed to or formed as part of the shaft. When the shaft 218 is rotated in a first direction (counter-clockwise as viewed in FIG. 16) the spring 226 drives the lock member 214 in the first direction and the shaft 218 and lock member may co-rotate, or there may be some rotation of the shaft relative to the lock member (i.e. a lost motion coupling) before the spring causes the lock member to rotate. When the engagement member 216, shown as a tab that extends outwardly from the lock member 214, is received in the void 34, as shown in FIG. 16, rotation of the lock body 22 is prevented.

Figure 17:
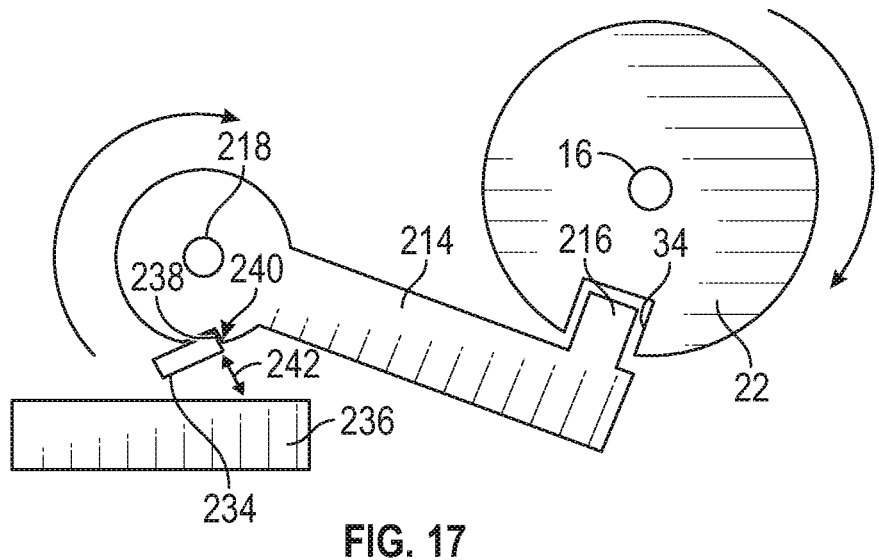
FIG. 17 is a front view with an actuator assembly removed to show a lock member, lock body and lock member retainer engaged with the lock member.
Figure 18:
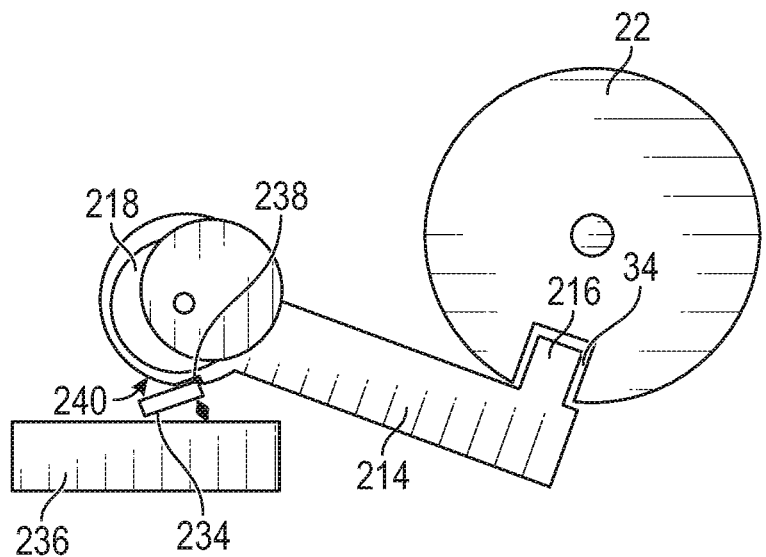
FIG. 18 is a view similar to FIG. 18 with a cam of the actuator assembly shown.

In at least some implementations, to prevent the lock member 214 from becoming disengaged from the lock body 22 unintentionally and against the force of the spring 226, a lock member retainer 234 may be provided. In at least some implementations, the lock member retainer 234 may be a rigid member that is coupled to a support 236 (e.g. a housing) and is movable relative to the lock member 214 between first and second positions, called engaged and disengaged positions hereafter. In the engaged position, as shown in FIGS. 16-18, the retainer 234 engages a retaining surface 238 of the lock member, which is defined in and by a notch 240 formed in the lock member 214 in the implementation shown in the drawings. The notch 240 and retaining surface 238 may be best seen in FIG. 17 in which the shaft 218 and cam 232 have been removed to more clearly show the lock member 214 and retainer 234. With the retainer 234 in its engaged position, rotation of the lock member 214 away from the lock body 22 is prevented and the lock assembly 210 is positively retained (i.e. by engagement of rigid components that prevent rotation of the lock member) in the locked position. The retainer 234 may be biased, such as by a spring 242, to the engaged position so that the retainer is automatically in the engaged position when the lock member 214 is rotated to the locked position and the notch 240 is aligned with the retainer. The retainer 234 could instead be flexible and resilient, and bent into engagement with the lock member 214 to engage the retaining surface 238 when aligned therewith.

Figure 19:
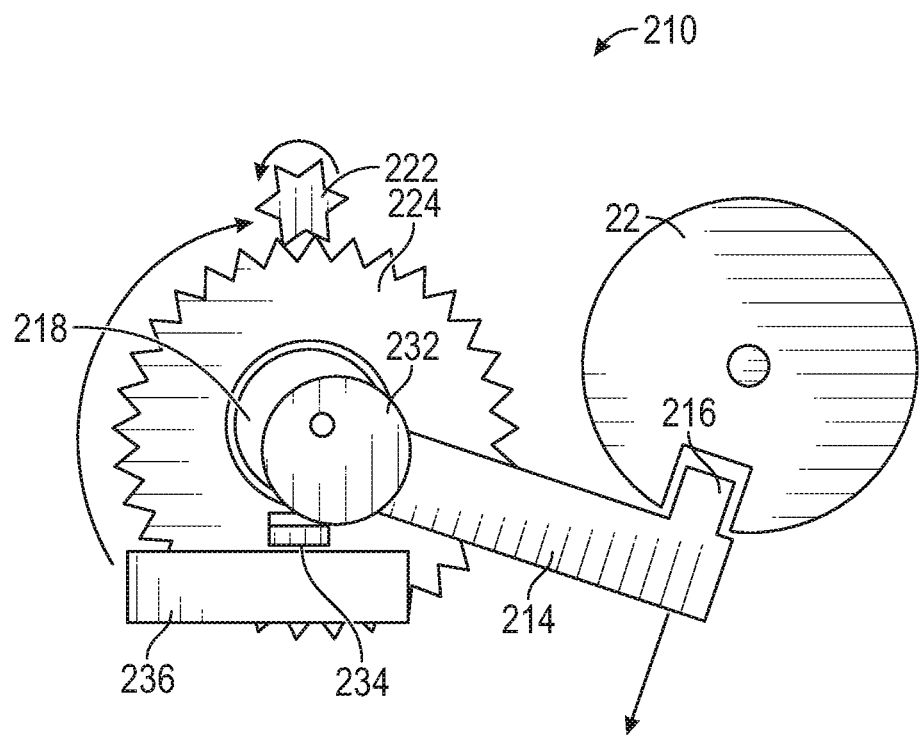
FIG. 19 is a front view of the assembly shown in an intermediate position with the cam rotated to disengage the lock member retainer from the lock member.
Figure 20:
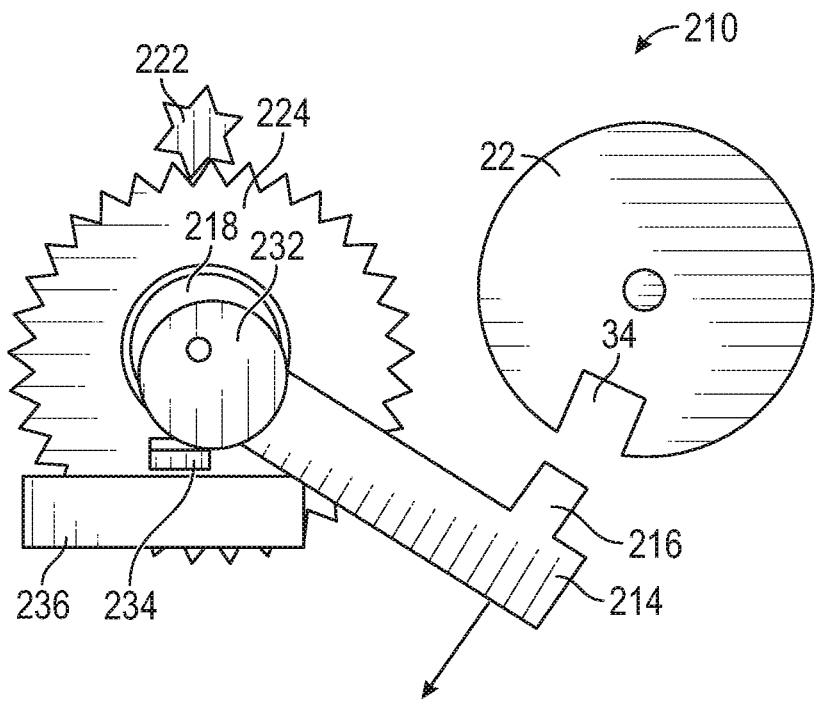
FIG. 20 is a front view of the assembly shown in an unlocked position.

To permit unlocking of the assembly 210, the retainer 234 is moved to its disengaged position as shown in FIGS. 19-20. In at least some implementations, this is accomplished by energizing the motor 220 to rotate the shaft 218 in the second direction (clockwise in the orientation of the assembly shown in the drawings) until the cam 232 engages the retainer 234 and moves the retainer out of the notch 240 and clear of the lock member 214, as shown in FIG. 19. This rotation of the shaft 218 also increases the torque in the spring 226 in a direction tending to rotate the lock member 214 in the second direction and away from the lock body 22 to remove the engagement member from the void 34, as shown in FIG. 20. This defines the unlocked position of the assembly 210 in which the lock body 22 is free to rotate to permit movement of the vehicle.

Figure 21:
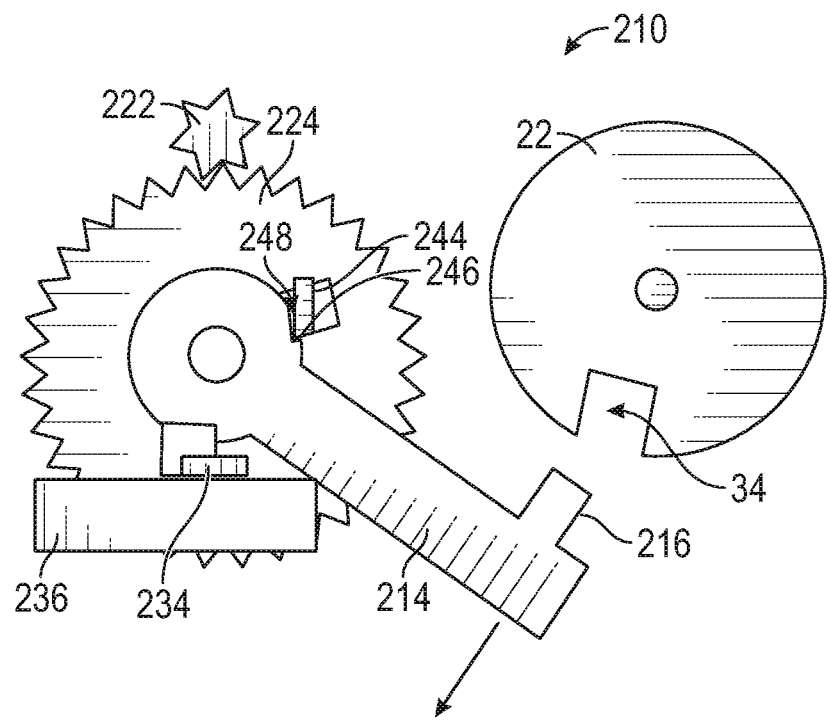
FIG. 21 is a front view of the assembly including a second lock member retainer arranged to maintain the lock member in the unlocked position.
Figure 22:
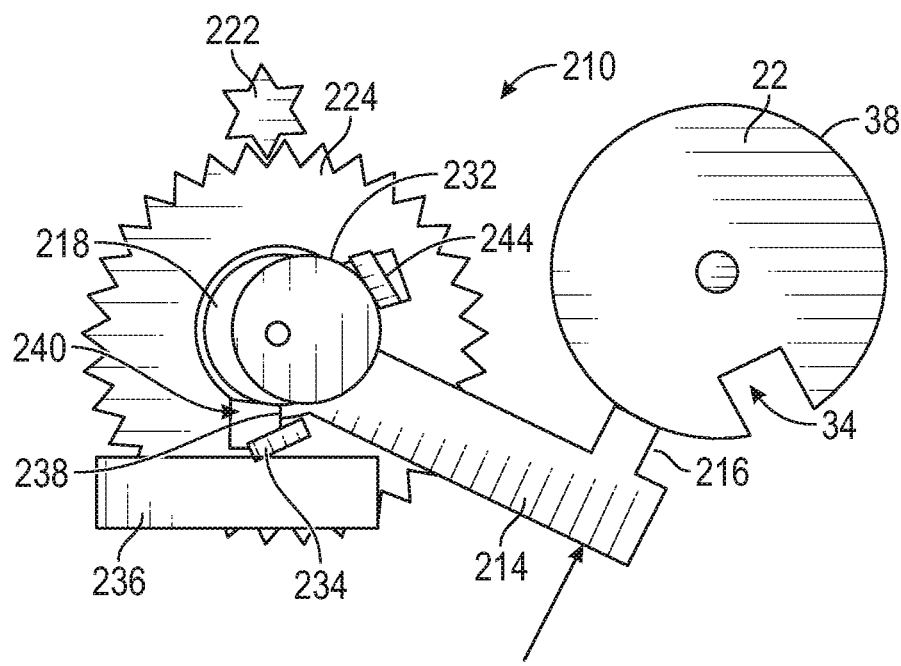
FIG. 22 is a front view of the assembly showing the assembly in an intermediate position.
Figure 23:
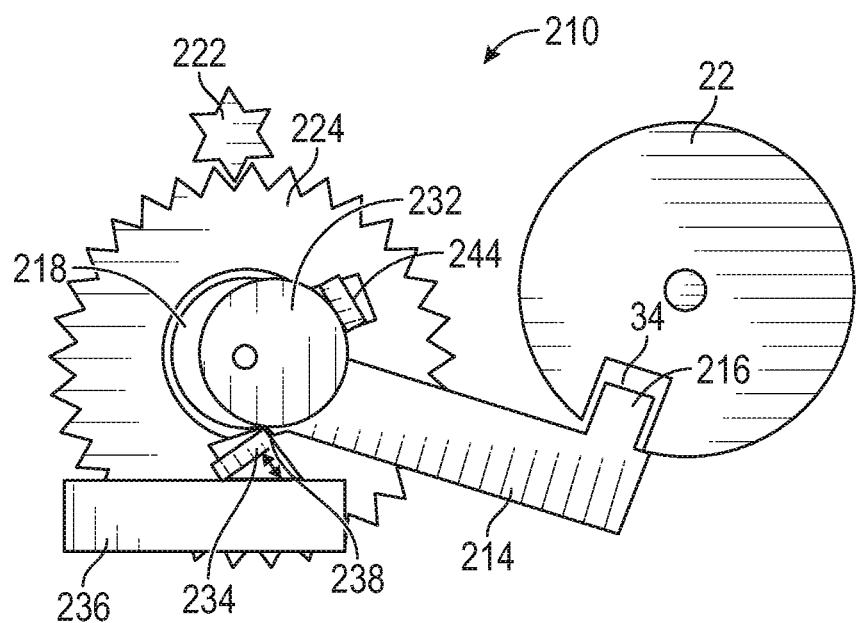
FIG. 23 is a front view of the assembly in the locked position with the first lock member retainer engaged with the lock member.

In at least some implementations, to prevent unintended locking of the lock assembly 210, such as may be caused by the vehicle traveling over a bump or other impulse/acceleration force acting on the lock member 214, the assembly may include a second lock member retainer 244. The second lock member retainer 244 may be arranged to engage the lock member 214 when the lock member is in the disengaged position, as shown in FIG. 21 wherein the shaft 218 and cam 232 have been removed to better show the lock member and second retainer. The second retainer 244 may be constructed and arranged in the same manner as the first retainer 234. And the second retainer 244 may be arranged to engage a second retaining surface 246 of the lock member, which may be defined in a second notch 248 in the lock member 214, to prevent rotation of the lock member in the first direction. When it is desired to lock the lock assembly 210, the shaft 218 is rotated in the first direction which engages the cam 232 with the second retainer 244 and moves the second retainer from the engaged to the disengaged position clear of and permitting rotation of the lock member. The spring 226 acts on the lock member 214 to rotate the lock member in the first direction, toward the lock body 22. In FIG. 22, the void 34 in the lock body 22 is not aligned with the engagement portion 216 of the lock member 214 so the engagement member is held against a peripheral surface 38 of the lock body 22 by the spring force. Rotation of the lock body 22 eventually aligns the void 34 with the engagement member 216 and the engagement member enters the void as shown in FIG. 23. The first retainer 234 also moves to its engaged position when the first notch 240 is aligned with the first retainer, and the first retainer engages the first retaining surface 238 to retain the assembly 210 in the locked position. Thus, the assembly 210 is reset in the locked position shown in FIGS. 15-18 (with the exception that FIG. 23 shows an assembly 210 with a second retainer 244). Hence, the assembly 210 may be positively held in either or both of the locked and unlocked positions by engagement of the lock member with one or more retainers. And the retainers may be disengaged by the same actuator or actuating assembly that drives the lock member relative to the lock body. That is, by rotation of a shaft that causes rotation of the lock member, the retainers can be moved from their engaged position to their disengaged position. Of course, other arrangements may be used, including assemblies that include a different actuator to move the retainers, or where the actuator(s) move the retainers to their engaged position instead of moving them to their disengaged positions as set forth above. Additionally, instead of relying on the force of the spring 226 to release the lock member from the lock body, a mover 250 (FIG. 16) may be provided to engage the lock member and positively move it from the lock body 22 when the shaft 18 is rotated by the motor 220. The mover 250 may be fixed to and extend outwardly from the shaft 218 for co-rotation with the shaft.

While the forms of the invention herein disclosed constitute presently preferred embodiments, many others are possible. It is not intended herein to mention all the possible equivalent forms or ramifications of the invention. It is understood that the terms used herein are merely descriptive, rather than limiting, and that various changes may be made without departing from the spirit or scope of the invention.

The invention claimed is:

1. A park lock assembly for a rotary component of a vehicle, comprising:
a lock body having at least one void;
a lock member having an engagement portion selectively received within one of said at least one void;
an actuator having a motor connected to a drive shaft, the drive shaft rotatable about a first axis and disposed through an end of the lock member opposite the engagement portion, the actuator further including a drive coupling disposed axially between the motor and the lock member and fixed for co-rotation with the drive shaft, the drive coupling having a drive tab extending in a direction parallel to the first axis;
a biasing member disposed about the drive shaft and disposed axially between the drive coupling and the lock member, the biasing member having a first end engageable with the drive tab and a second end engageable with the lock member, the biasing member providing a force on the lock member tending to move the lock member toward the lock body,
wherein rotation of the drive shaft in a first direction rotates the drive coupling and the drive tab contacts the lock member to move the lock member out of engagement with the lock body, and wherein rotation of the drive shaft in a second direction rotates the drive coupling and the drive tab contacts the first end of the biasing member which compresses the biasing member and moves the lock member into engagement with the lock body.

2. The assembly of claim 1, wherein the drive coupling includes a central bore through which the drive shaft extends.

3. The assembly of claim 1, wherein the drive coupling includes a radially extending flange that supports the biasing member and the lock member in a location along the first axis to align the lock member with the lock body.

4. The assembly of claim 1, wherein the drive shaft is not rotatingly coupled to the lock member.

5. The assembly of claim 1, wherein the drive shaft extends through the biasing member.

6. The assembly of claim 1, wherein the drive tab is disposed outwardly perpendicular to the first axis.

7. The assembly of claim 6, wherein the drive tab extends in the direction parallel to the first axis towards the lock member.

8. The assembly of claim 1, wherein the biasing member contacts an outer surface of the end of the lock member opposite the engagement portion.

9. The assembly of claim 1, wherein the lock body rotates about a second axis, wherein the second axis is parallel and offset relative to the first axis.

* * * * *